US012669308B2

(12) United States Patent
Wright et al.

(10) Patent No.: US 12,669,308 B2
(45) Date of Patent: Jun. 30, 2026

(54) TARGET TRACKING APPARATUS AND ASSOCIATED SYSTEMS METHODS

(71) Applicant: The Boeing Company, Arlington, VA (US)

(72) Inventors: Steven Wright, Troy, MO (US); Les Palmer, St. Louis, MO (US); Hunter Banks, St. Louis, MO (US); Andrew Willis, Festus, MO (US)

(73) Assignee: The Boeing Company, Arlington, VA (US)

( * ) Notice: Subject to any disclaimer, the term of this patent is extended or adjusted under 35 U.S.C. 154(b) by 285 days.

(21) Appl. No.: 18/608,676

(22) Filed: Mar. 18, 2024

(65) Prior Publication Data

US 2025/0123077 A1      Apr. 17, 2025

Related U.S. Application Data

(60) Provisional application No. 63/543,619, filed on Oct. 11, 2023.

(51) Int. Cl.
F41G 7/22          (2006.01)
G05D 1/243          (2024.01)
(Continued)

(52) U.S. Cl.
CPC ......... F41G 7/2213 (2013.01); F41G 7/2253 (2013.01); G05D 1/243 (2024.01); G05D 1/689 (2024.01); G05D 2109/28 (2024.01)

(58) Field of Classification Search
CPC ...... F41G 7/2213; F41G 7/2253; F41G 7/008; F41G 7/2293; F41G 7/26; G05D 1/243; G05D 1/689; G05D 2109/28
See application file for complete search history.

(56) References Cited

U.S. PATENT DOCUMENTS 2,823,612 A * 2/1958 Cox ...................... F41G 7/2293
                                                                              359/736
5,440,337 A 8/1995 Henderson
(Continued)

FOREIGN PATENT DOCUMENTS

DE          4325589          11/1999
DE      102010015645          11/2010

OTHER PUBLICATIONS

Extended European Search Report for EP Application No. 24197829.5 dated Feb. 26, 2025.

*Primary Examiner* — Bernarr E Gregory

(74) *Attorney, Agent, or Firm* — Massey Bean & Lewis

(57) ABSTRACT

A target tracking apparatus includes a housing that defines an exterior surface and comprises an interior cavity, a distal opening, and an intermediate opening. The target tracking apparatus also includes a distal-end window attached to the housing over the distal opening and defining a distal end of the target tracking apparatus. The target tracking apparatus further includes an intermediate window attached to the housing over the intermediate opening. The target tracking apparatus additionally includes a first camera within the interior cavity, configured to capture images through the distal-end window, and fixed, relative to the housing, such that the first camera does not move relative to the housing. The target tracking apparatus also includes a second camera within the interior cavity, configured to capture images through the intermediate window, and fixed, relative to the housing, such that the second camera does not move relative to the housing.

20 Claims, 11 Drawing Sheets

(51) Int. Cl.
    *G05D 1/689*      (2024.01)
    *G05D 109/28*    (2024.01)

(56)          References Cited

U.S. PATENT DOCUMENTS

| | | | | |
|---|---|---|---|---|
| 5,647,560 | A * | 7/1997 | Schnatz | F41G 7/2293 244/3.15 |
| 6,138,944 | A * | 10/2000 | McCowan | F41G 7/26 244/3.13 |
| 7,397,019 | B1 * | 7/2008 | Byars | F41G 7/2293 250/206.1 |
| 8,575,527 | B2 * | 11/2013 | Fry | F41G 7/2293 342/52 |
| 10,343,766 | B2 | 7/2019 | Miralles | |
| 2001/0013565 | A1 * | 8/2001 | Davidovitch | F41G 7/2213 244/3.15 |
| 2003/0016348 | A1 * | 1/2003 | Sallee | F41G 7/2293 356/141.1 |
| 2021/0055079 | A1 | 2/2021 | Choiniere | |

* cited by examiner

TARGET TRACKING APPARATUS AND ASSOCIATED SYSTEMS METHODS

FIELD

This disclosure relates generally to tracking targets, and more particularly to tracking aerial targets using a maneuverable flight apparatus.

BACKGROUND

High-speed missiles can be used to track and destroy targets, such as aerial targets. Some conventional missiles rely on gimbaled camera systems to capture images of an aerial target. The images are used to identify and locate the aerial target. The location of the aerial target is then used to navigate the missile towards and into contact with the aerial target.

Gimbaled camera systems include a gimbal mechanism that moves one or more cameras relative to the direction the missile is traveling (e.g., relative to the body of the missile). The movement of the cameras in this manner enables tracking of moving targets. However, gimbaled camera systems are complex, bulky, and require a blunt, non-aerodynamic, window at the leading end of the missile to capture images, which results in reduced range or greater propellant for a given mission. Accordingly, gimbaled camera systems add to the cost, weight, and drag associated with making and using the missile.

Additionally, because missiles generate significant heat when tracking a target during flight, the imaging sensors of some conventional camera systems must be cooled before use. Often, imaging sensors are cooled using external high-pressure gas bottles. The need to cool imaging sensors before a missile is launched can cause significant delays, which may result in missed opportunities to track and intercept a target.

SUMMARY

The subject matter of the present application has been developed in response to the present state of the art, and in particular, in response to the shortcomings of conventional missiles that incorporate a gimbaled camera system, that have not yet been fully solved by currently available techniques. Accordingly, the subject matter of the present application has been developed to provide a maneuverable flight apparatus, and associated target tracking apparatus and methods of use, which overcome at least some of the above-discussed shortcomings of prior art techniques.

The following is a non-exhaustive list of examples, which may or may not be claimed, of the subject matter, disclosed herein.

Disclosed herein is a target tracking apparatus that includes a housing defining an exterior surface of the target tracking apparatus. The housing includes an interior cavity, a distal opening formed in the exterior surface, at a distal end portion of the target tracking apparatus, and open to the interior cavity, and an intermediate opening formed in the exterior surface, at a location between the distal end portion and a proximal end portion of the target tracking apparatus. The target tracking apparatus also includes a distal-end window attached to the housing over the distal opening and defining a distal end of the target tracking apparatus. The target tracking apparatus further includes an intermediate window attached to the housing over the intermediate opening. The target tracking apparatus additionally comprises a first camera within the interior cavity, configured to capture images through the distal-end window, and fixed, relative to the housing, such that the first camera does not move relative to the housing. The target tracking apparatus also includes a second camera within the interior cavity, configured to capture images through the intermediate window, and fixed, relative to the housing, such that the second camera does not move relative to the housing. The preceding subject matter of this paragraph characterizes example 1 of the present disclosure.

The exterior surface converges along a length of the target tracking apparatus from the proximal end portion of the target tracking apparatus to the distal end portion of the target tracking apparatus. The preceding subject matter of this paragraph characterizes example 2 of the present disclosure, wherein example 2 also includes the subject matter according to example 1, above.

A maximum width of the distal-end window, along a first plane perpendicular to the length of the target tracking apparatus, is less than a maximum width of the housing, along a second plane perpendicular to the length of the target tracking apparatus. The preceding subject matter of this paragraph characterizes example 3 of the present disclosure, wherein example 3 also includes the subject matter according to example 2, above.

A central axis of the target tracking apparatus passes through a geometric center of the housing and a geometric center of the distal-end window. The first camera is pointed in a first direction that is angled relative to the central axis. The second camera is pointed in a second direction that is angled relative to the central axis and angled relative to the first direction. The preceding subject matter of this paragraph characterizes example 4 of the present disclosure, wherein example 4 also includes the subject matter according to any of examples 1-3, above.

The central axis, the first direction, and the second direction lie within the same plane. A first camera angle defined between the central axis and the first direction is less than a second camera angle defined between the central axis and the second direction. The preceding subject matter of this paragraph characterizes example 5 of the present disclosure, wherein example 5 also includes the subject matter according to example 4, above.

The first camera has a first field of view. The second camera has a second field of view. The first field of view and the second field of view overlap beyond a distance away from the target tracking apparatus. The preceding subject matter of this paragraph characterizes example 6 of the present disclosure, wherein example 6 also includes the subject matter according to example 5, above.

The first field of view is less than the second field of view. The preceding subject matter of this paragraph characterizes example 7 of the present disclosure, wherein example 7 also includes the subject matter according to any of examples 5-6, above.

The first camera and the second camera are angled away from the central axis in the same direction. The preceding subject matter of this paragraph characterizes example 8 of the present disclosure, wherein example 8 also includes the subject matter according to any of examples 5-7, above.

The second camera is offset, along a length of the target tracking apparatus, relative to the first camera. The preceding subject matter of this paragraph characterizes example 9 of the present disclosure, wherein example 9 also includes the subject matter according to any of examples 1-8, above.

A central axis of the target tracking apparatus passes through a geometric center of the housing and a geometric center of the distal-end window. The distal-end window is curved along a plane that passes through the distal-end window and within which the central axis lies. The intermediate window is curved along a plane that passes through the intermediate window and within which the central axis lies. The curvature of the distal-end window, along the plane that passes through the distal-end window and within which the central axis lies, is more than the curvature of the intermediate window, along the plane that passes through the intermediate window and within which the central axis lies. The preceding subject matter of this paragraph characterizes example 10 of the present disclosure, wherein example 10 also includes the subject matter according to any of examples 1-9, above.

A central axis of the target tracking apparatus passes through a geometric center of the housing and a geometric center of the distal-end window. The distal-end window is circular shaped along a plane perpendicular to the central axis. The intermediate window is elongated in a direction parallel to the central axis of the target tracking apparatus. The preceding subject matter of this paragraph characterizes example 11 of the present disclosure, wherein example 11 also includes the subject matter according to any of examples 1-10, above.

The target tracking apparatus is void of a camera cooling system. The preceding subject matter of this paragraph characterizes example 12 of the present disclosure, wherein example 12 also includes the subject matter according to any of examples 1-11, above.

The target tracking apparatus defines a front end of a missile. The preceding subject matter of this paragraph characterizes example 13 of the present disclosure, wherein example 13 also includes the subject matter according to any of examples 1-12, above.

Further disclosed herein is a maneuverable flight apparatus for tracking a target. The maneuverable flight apparatus includes a target tracking apparatus. The target tracking apparatus includes a housing. The target tracking apparatus also includes a distal-end window attached to the housing over a distal opening in the housing. The target tracking apparatus further includes an intermediate window attached to the housing over an intermediate opening in the housing that is offset from the distal opening along a length of the housing. The target tracking apparatus additionally includes a first camera within the housing, configured to capture images through the distal-end window, and fixed, relative to the housing, such that the first camera does not move relative to the housing. The target tracking apparatus also includes a second camera within the housing, configured to capture images through the intermediate window, and fixed, relative to the housing, such that the second camera does not move relative to the housing. The maneuverable flight apparatus also includes flight control surfaces actuatable to control pitch, roll, and yaw of the maneuverable flight apparatus when the maneuverable flight apparatus is in flight. The maneuverable flight apparatus further includes a propulsion system configured to generate thrust. The maneuverable flight apparatus additionally includes a flight controller configured to actuate the flight control surfaces based on images of the target captured by at least one of the first camera or the second camera. The preceding subject matter of this paragraph characterizes example 14 of the present disclosure.

The flight controller is configured to actuate the flight control surfaces to roll the maneuverable flight apparatus from a first orientation to a second orientation when the maneuverable flight apparatus is in the first orientation and the target is not in or is predicted not to be in the images captured by the first camera and the second camera. The second orientation is selected by the flight controller so that the target is in the images captured by the second camera when the maneuverable flight apparatus is in the second orientation. The preceding subject matter of this paragraph characterizes example 15 of the present disclosure, wherein example 15 also includes the subject matter according to example 14, above.

The flight controller is configured to actuate the flight control surfaces to roll the maneuverable flight apparatus when the target is not in or is predicted not to be in a field of view of either of the first camera or the second camera so that when rolled the target is in the field of view of at least the second camera. The preceding subject matter of this paragraph characterizes example 16 of the present disclosure, wherein example 16 also includes the subject matter according to any of examples 14-15, above.

A central axis of the target tracking apparatus passes through a geometric center of the housing and a geometric center of the distal-end window. The first camera is pointed in a first direction that is angled relative to the central axis. The second camera is pointed in a second direction that is angled relative to the central axis and angled relative to the first direction. The preceding subject matter of this paragraph characterizes example 17 of the present disclosure, wherein example 17 also includes the subject matter according to any of examples 14-16, above.

The maneuverable flight apparatus is a missile. The target tracking apparatus defines a front end of the missile. The housing is tapered. The preceding subject matter of this paragraph characterizes example 18 of the present disclosure, wherein example 18 also includes the subject matter according to any of examples 14-17, above.

Additionally disclosed herein is a method of tracking a target. The method includes flying a maneuverable flight apparatus toward the target. The method also includes capturing images of the target by at least one of a first camera of the maneuverable flight apparatus, which faces a first direction that is fixed relative to the direction of flight of the maneuverable flight apparatus, or a second camera of the maneuverable flight apparatus, which is offset from the first camera along a length of the maneuverable flight apparatus and faces a second direction that is fixed relative to the direction of flight of the maneuverable flight apparatus. The second direction is different than the first direction. The method further includes rolling the maneuverable flight apparatus when the target is not in or is predicted not to be in a field of view of either of the first camera or the second camera so that when rolled the target is in the field of view of at least the second camera. The preceding subject matter of this paragraph characterizes example 19 of the present disclosure.

The maneuverable flight apparatus is a missile and flying the maneuverable flight apparatus includes launching the missile from a ground location using a hand-held gripstock. The preceding subject matter of this paragraph characterizes example 20 of the present disclosure, wherein example 20 also includes the subject matter according to example 19, above.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not therefore to be considered to be limiting of its scope, the subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Described herein are examples of a maneuverable flight apparatus and its corresponding target tracking apparatus that enable tracking of a target in a manner that saves on costs and weight, improves drag, and does not require or have a cooling system. The maneuverable flight apparatus of the present disclosure includes cameras with orientations that are fixed relative to the direction of flight of the maneuverable flight apparatus (e.g., relative to a body of the maneuverable flight apparatus). Conventional missiles require active and prolonged cooling prior to launch to ensure gimbaled cameras are sufficiently cooled prior to launch, which undesirably prolongs the launch preparation process. The nature of the cameras of the present disclosure enables the cameras to operate without cooling before launch, which promotes a faster launch preparation process. Additionally, the cameras of the maneuverable flight apparatus, being fixed, enable the cameras to fit within a smaller form factor, compared to gimbaled camera systems, which promotes a more aerodynamic shape, compared to flight apparatuses with gimbaled camera systems. The ability of the cameras of the maneuverable flight apparatus of the present disclosure to cover a wide field of view, necessary for tracking moving targets, is facilitated by rolling the apparatus during flight to rotationally shift the field of view. The combination of fixed cameras and the roll-based adjustment of the field of view of the cameras enhances the ability of the target tracking apparatus to discriminate and track a target relative to clutter or other objects in a scene.

Figure 1:
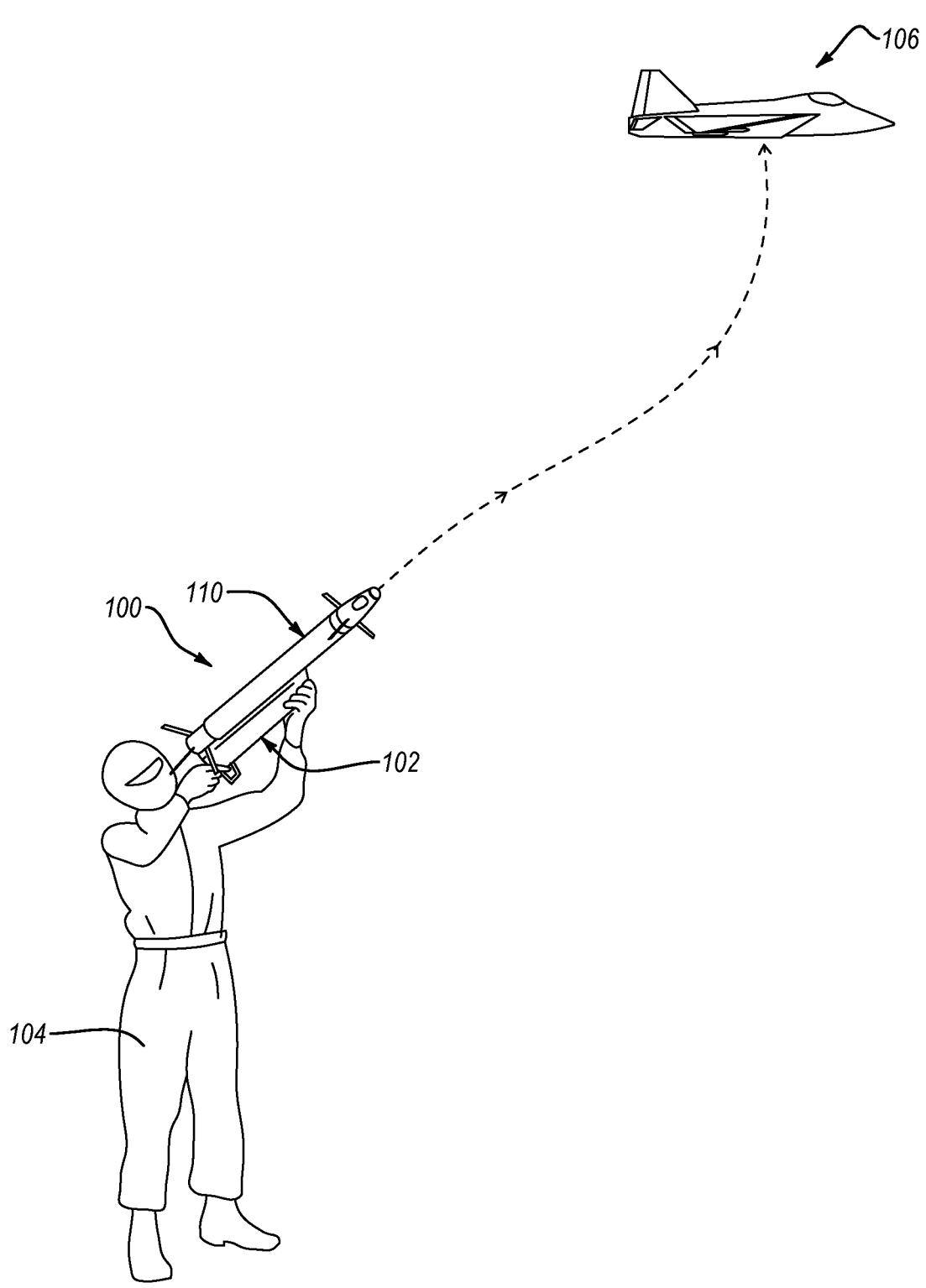
FIG. 1 is a schematic perspective view of a system for tracking a target, according to one or more examples of the present disclosure.

Referring to FIG. 1, according to some examples, a system 100 for tracking a target 106 includes a hand-held gripstock 102 and a maneuverable flight apparatus 110. The hand-held gripstock 102 is configured to retain, initially aim, and launch the maneuverable flight apparatus 110. The hand-held gripstock 102 is configured to be held by personnel 104. Accordingly, in one example, the personnel 104, located on the ground, can hold the gripstock 102, with the maneuverable flight apparatus 110 attached, aim the maneuverable flight apparatus 110 at a target 106, and manually launch the maneuverable flight apparatus 110 toward the target 106. In the illustrated example, the target 106 is an aerial or flying target. For example, the target 106 can be one of, but not limited to, a manned fixed wing aircraft, a manned rotary wing aircraft, an unmanned aerial vehicle, and the like. According to some examples, the target 106 can be a moving or non-moving target, such as a tank, personnel carrier, watercraft, etc., on the ground. Although the maneuverable flight apparatus 110 is shown being launched from a hand-held gripstock 102, in other examples, the maneuverable flight apparatus 110 can be launched in other ways, such as from a vehicle or stationary/mobile mechanized tube launcher, on the ground, or from an aircraft, in flight.

Figure 2:
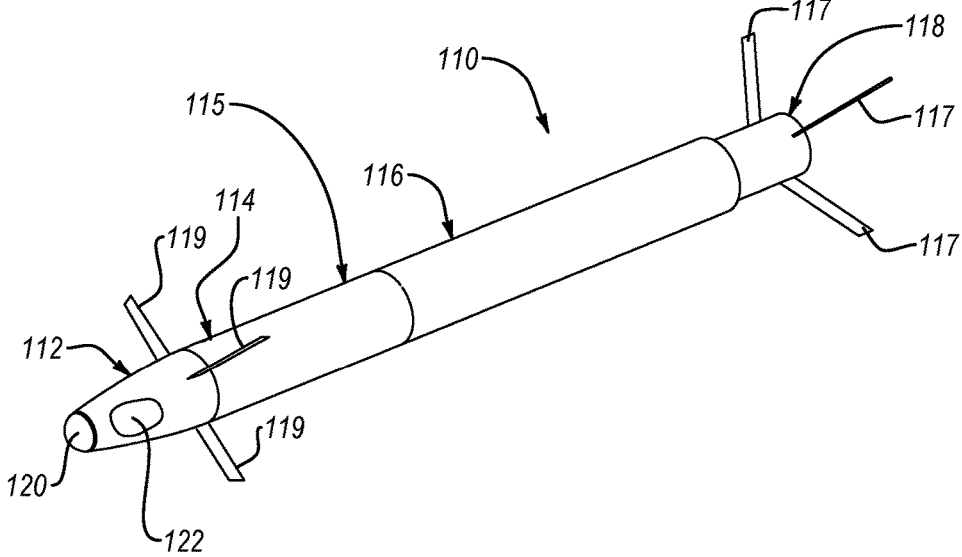
FIG. 2 is a schematic perspective view of a maneuverable flight apparatus, according to one or more examples of the present disclosure.
Figure 3:
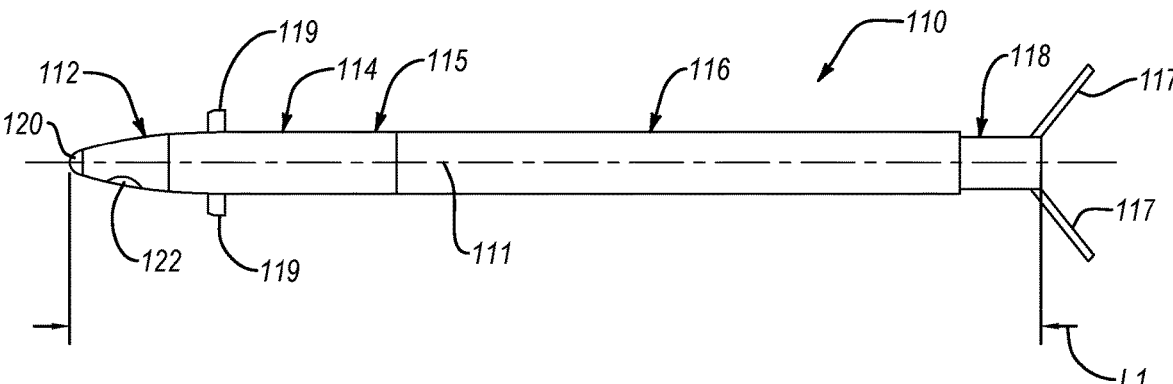
FIG. 3 is a schematic side elevation view of a maneuverable flight apparatus, according to one or more examples of the present disclosure.

Referring to FIGS. 2 and 3, in some examples, the maneuverable flight apparatus 110 includes a target tracking apparatus 112 that is configured to identify and track the target 106 based on, at least partially, images captured by the target tracking apparatus 112. The maneuverable flight apparatus 110 can be any of various apparatuses capable of sustained and controllable flight. In the illustrated examples of FIGS. 1-3, the maneuverable flight apparatus 110 is a missile and the target tracking apparatus 112 is a seeker portion of the missile, which also defines a nose or leading/front end of the missile. The target tracking apparatus 112 includes a distal-end window 120 and an intermediate window 122 through which images are captured. In such examples, the maneuverable flight apparatus 110 additionally includes a controller portion 114, a warhead portion 115, a motor portion 116, and a nozzle portion 118. The controller portion 114 includes a flight controller 172 and other computer processing equipment, an electronic power source, and a flight control surfaces 119. The flight control surfaces 119 are actuatable to change flight characteristics (e.g., flight path, roll, etc.) of the maneuverable flight apparatus 110 during flight. The warhead portion 115 includes a warhead or explosive designed to disable or destroy the target 106 upon impact with the target 106. The motor portion 116 provides the propulsion of the missile, and can include a primary solid rocket motor for sustained flight after an initial launch and a launch motor for providing propulsion for an initial launch of the missile. The nozzle portion 118 includes a nozzle through which combusted products from the motor portion 116 is expelled to generate thrust. The nozzle portion 118 also defines a trailing end of the missile and can include stabilizing fins 117, which are non-actuatable or fixed fins in some examples. In some examples, the motor portion 116 and the nozzle portion 118 collectively define a propulsion system of the maneuverable flight apparatus 110.

The maneuverable flight apparatus 110 has a length L1, extending from the leading end to the trailing end of the maneuverable flight apparatus 110. The maneuverable flight apparatus 110 also has a width W defined as a dimension of a body of the maneuverable flight apparatus 110 in a direction perpendicular to the length L1 and excluding any fins extending from the body. In the illustrated examples where the maneuverable flight apparatus 110 is a missile, the body is a cylindrical body and the width W is a diameter of the body. In some examples, a ratio of the length L1 to a maximum value of the width W (e.g., diameter) is between, and inclusive of, 16 and 26, such as at least 21. According to one example, the width W is about 2.75 inches and the length L1 is about 58 inches, where "about" can mean +/−10%.

Figure 4:
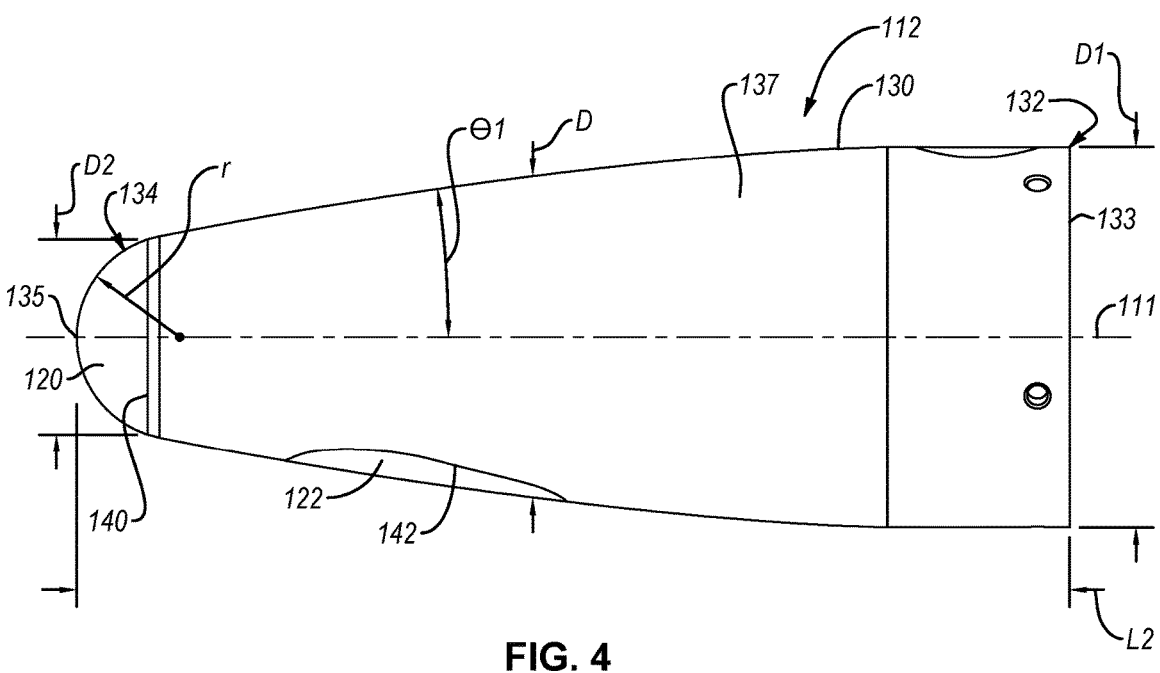
FIG. 4 is a schematic side elevation view of a target tracking apparatus, according to one or more examples of the present disclosure.
Figure 5:
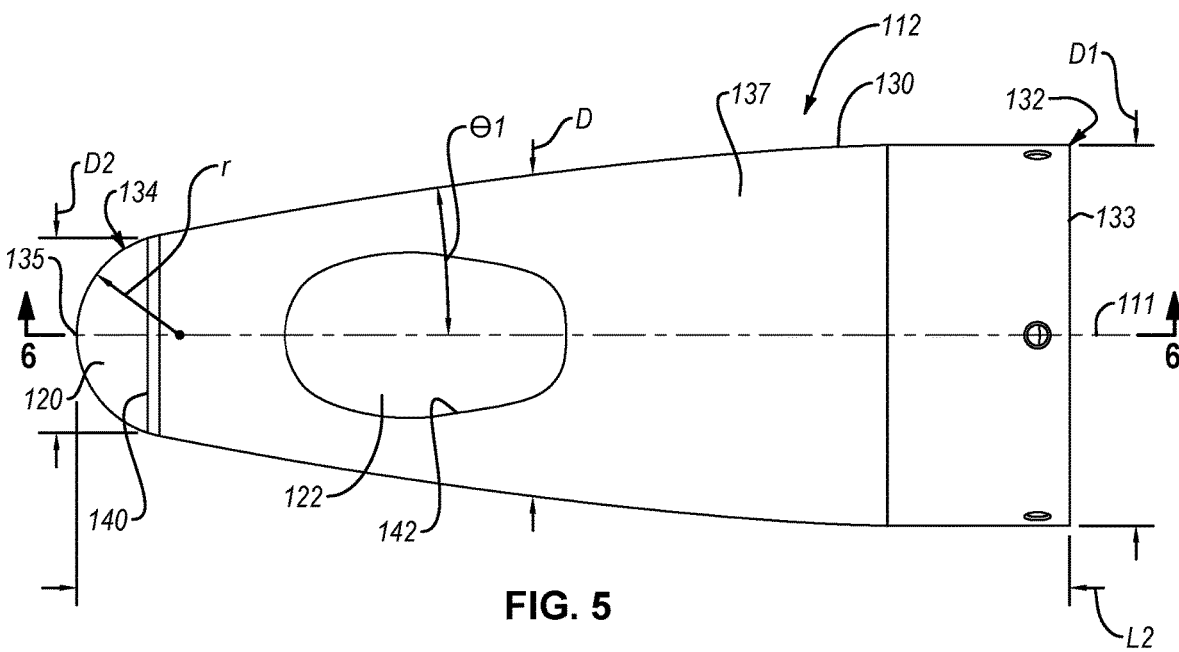
FIG. 5 is a schematic bottom plan view of the target tracking apparatus of FIG. 4, according to one or more examples of the present disclosure.
Figures 8, 9:
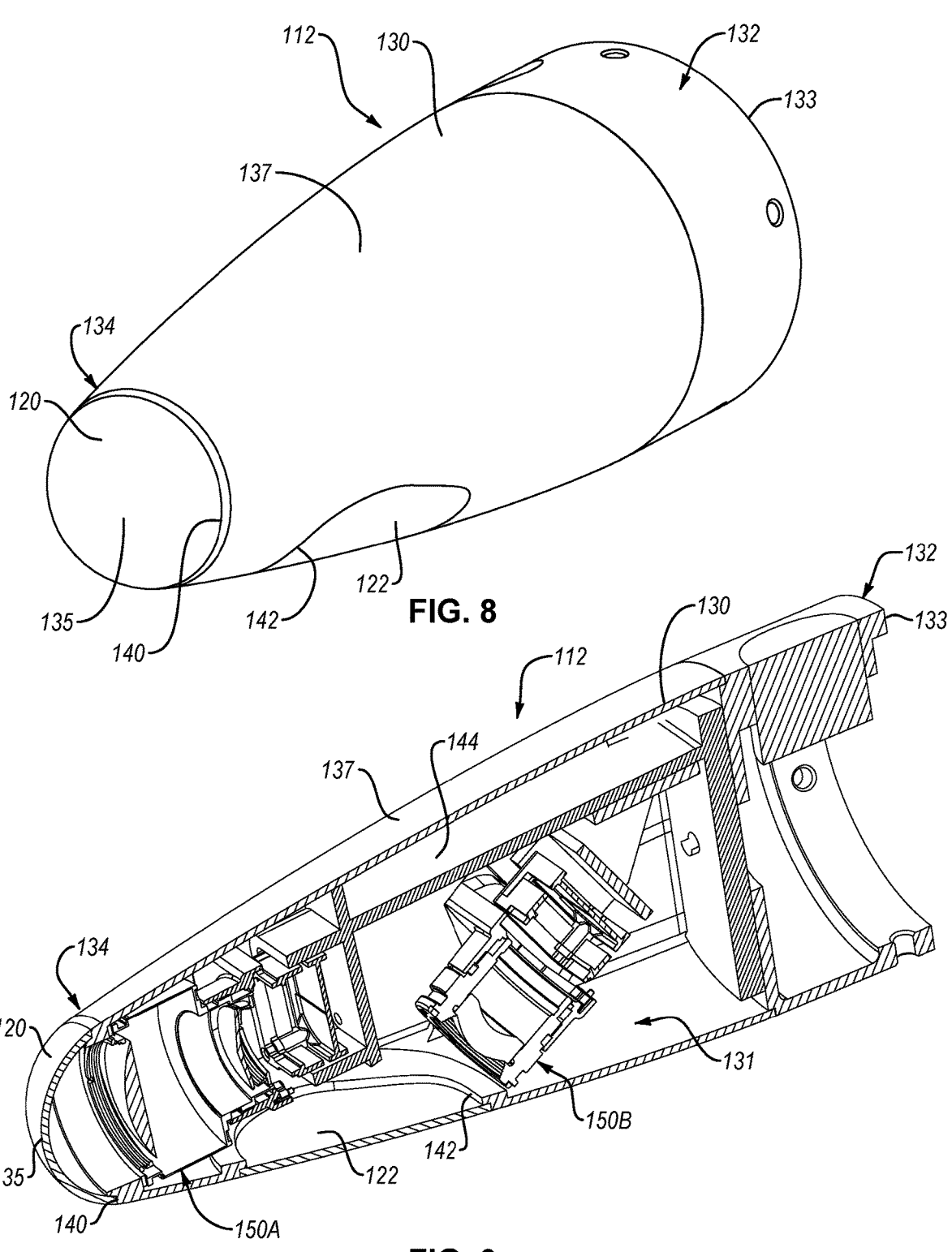
FIG. 8 is a schematic perspective view of the target tracking apparatus of FIG. 4, according to one or more examples of the present disclosure.
FIG. 9 is a schematic sectional perspective view of the target tracking apparatus of FIG. 4, taken along the line 6-6 of FIG. 5, according to one or more examples of the present disclosure.

Referring to FIGS. 4, 5, and 8, the target tracking apparatus 112 includes a housing 130 that defines an exterior surface 137 of the target tracking apparatus 112. The housing 130 also includes an interior cavity 131 defined by an interior surface of the target tracking apparatus 112, which is opposite the exterior surface 137. The housing 130 defines and extends from a proximal end portion 132 of the target tracking apparatus 112 to a distal end portion 134 of the target tracking apparatus 112. Moreover, the housing 130 is open at a proximal end 133 of the target tracking apparatus 112 and open at a distal opening 140 of the housing 130. The proximal end 133 is defined as a proximal-most end of the target tracking apparatus 112. The distal opening 140 forms part of the distal end portion 134 and is located at a distal-most end of the housing 130. Accordingly, the housing 130 extends, along a length L2 of the target tracking apparatus 112, from the proximal end 133 of the target tracking apparatus 112 to the distal opening 140. The distal opening 140 is formed in the exterior surface 137 of the housing 130 and is open to the interior cavity 131.

The housing 130 also includes an intermediate opening 142 formed in the exterior surface 137 of the housing 130 and open to the interior cavity 131. The intermediate opening 142 is formed in the housing 130 at a location between the distal end portion 134 and the proximal end portion 132 of the target tracking apparatus 112. Put another way, the intermediate opening 142 is located between the distal opening 140 and the proximal end 133 of the target tracking apparatus 112. In some examples, the intermediate opening 142 is offset away from the distal opening 140 in a direction parallel to a central axis 111 of the target tracking apparatus 112, which is coaxial with a central axis of the maneuverable flight apparatus 110. Accordingly, an entirety of the intermediate opening 142 can be between the distal opening 140 and the proximal end portion 132.

In the illustrated example, the housing 130 is shaped such that at least a portion of the exterior surface 137 converges or tapers, along the central axis 111 or the length L2 of the target tracking apparatus 112, in a direction extending from the proximal end portion 132 to the distal end portion 134. The converging portion of the housing 130 has a circular cross-sectional shape, in some examples, thus the converging portion can be considered to have a cone or cone-like (e.g., having a Von Karman curve) shape in those examples. The convergence or taper of the converging portion of the housing 130 can be defined by an angle θ1 (i.e., minor angle) defined between the exterior surface 137 of the converging portion and the central axis 111. In certain examples, the angle θ1 is an oblique angle of at least 8°, such as between, and inclusive of, 6° and 10°. According to some examples, an entirety of the housing 130 is tapered. However, in other examples, such as shown, the housing 130 includes a non-tapered portion, at the proximal end portion 132 of the target tracking apparatus 112, which attaches directly to the controller portion 114 of the maneuverable flight apparatus 110. Moreover, in certain examples, the housing 130 is shaped such that it does not have a converging or tapered portion (e.g., has a constant diameter).

The housing 130 has a dimension D (e.g., width or diameter) in a direction perpendicular to the central axis 111. The dimension D is equal to the maximum distance between opposing sides of the exterior surface 137 of the housing 130 in the direction perpendicular to the central axis 111. The dimension D of the tapering portion of the housing 130 decreases in a direction extending from the proximal end portion 132 to the distal end portion 134. Accordingly, the housing 130 has a maximum dimension D1 (e.g., maximum width or maximum diameter) at the proximal end 133 of the target tracking apparatus 112 and a minimum dimension D2 at the distal opening 140, which defines a distal end of the housing 130. In some examples, a ratio of the minimum dimension D2 to the maximum dimension D1 is no more than about 0.51, such as between, and inclusive of, 0.4 and 0.51, which helps reduce drag generated by the target tracking apparatus 112 when in flight. According to certain examples, the ratio of the minimum dimension D2 to the maximum dimension D1, divided by the length L2 of the target tracking apparatus 112, is no more than about 0.07 per unit length, such as between, and inclusive of, 0.06 per unit length and 0.07 per unit length. In one example, the maximum dimension D1 is about 2.75 inches, the minimum dimension D2 is about 1.41 inches, and the length L2 is about 7.17 inches.

The distal-end window 120 is attached to the proximal end of the housing 130 over the distal opening 140. Accordingly, the distal-end window 120 covers the distal opening 140. At this location, the distal-end window 120 defines a distal end 135 or a distal-most point of the target tracking apparatus 112. Therefore, the length L2 of the target tracking apparatus 112 is defined as the distance between the proximal end 133 and the distal end 135, defined by the distal-end window 120. In some examples, the central axis 111 of the target tracking apparatus 112 passes through a geometric center of the distal opening 140, which can be circular in certain examples, and a geometric center of the distal-end window 120, which has an outer peripheral shape that corresponds with the shape of the distal opening 140 (e.g., circular). According to one example, a maximum width (e.g., diameter) of the distal-end window 120, along a first plane perpendicular to the length L2 of the target tracking apparatus 112, is less than the maximum dimension D1, which can be along a second plane parallel to the first plane. The maximum width of the distal-end window 120 is equal to the minimum distance D2 of the housing 130 in some examples. The distal-end window 120 is curved along a plane parallel to or including the central axis 111 and defines the leading edge or nose of the target tracking apparatus 112. More specifically, in certain examples, the distal-end window 120 is rounded (e.g., hemi-spherical shaped, partly spherical shaped, curved, etc.) along the plane parallel to the central axis 111. In the illustrated example, the contour or curvature of the distal-end window 120 is constant, such that a radius of curvature r of the exterior surface of the distal-end window 120 is the same at any point along the exterior surface. According to some examples, a ratio of the radius of curvature r of the distal-end window 120 to the maximum dimension D1 of the housing 130 is at most about 0.27, such as between, and inclusive of, 0.2 and 0.34. In one example, the radius of curvature r is about 0.74 and the maximum dimension D1 is about 2.75.

The intermediate window 122 is attached to the housing 130 over the intermediate opening 142. Accordingly, the intermediate window 122 covers the intermediate opening 142. Moreover, like the intermediate opening 142, the intermediate window 122 is located between the distal end portion 134 and the proximal end portion 132 of the target tracking apparatus 112. Therefore, the intermediate window 122 is offset away from the distal-end window 120 in a direction parallel to the central axis 111. The distal-end window 120, the intermediate window 122, and the central axis 111 are aligned such that the distal-end window 120, the intermediate window 122, and the central axis 111 lie within the same plane. In some examples, the intermediate opening 142 and the intermediate window 122 are elongated in the direction parallel to the central axis 111. In certain examples, the intermediate window 122 is curved along a plane perpendicular to the central axis 111 (see, e.g., FIGS. 8 and 14A-14E) and has a curvature that matches the curvature of the housing 130. In contrast, according to some examples, at least a portion of the intermediate window 122 is flat, or has a Von Karman curve, along the plane parallel to or including the central axis 111 that passes through the intermediate window 122 (see, e.g., FIG. 4). When the intermediate window 122 is curved along this plane, the curvature is less than that of the distal-end window 120 along the plane parallel to or including the central axis 111.

Although, in the illustrated examples, the distal opening 140 and the intermediate opening 142 are separate openings, and the distal-end window 120 and the intermediate window 122 are separate windows, according to other examples, at least one of the distal opening 140 and the intermediate opening 142 are combined into one opening, or the distal-end window 120 and the intermediate window 122 are combined into one window.

Figure 6:
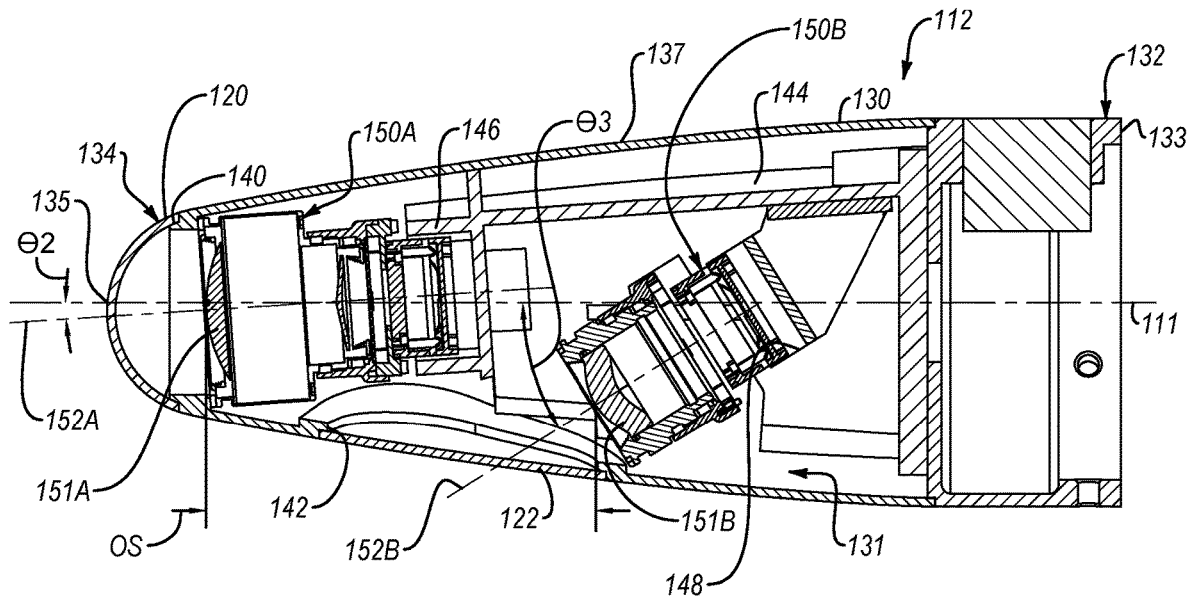
FIG. 6 is a schematic sectional side elevation view of the target tracking apparatus of FIG. 4, taken along the line 6-6 of FIG. 5, according to one or more examples of the present disclosure.
Figure 7:
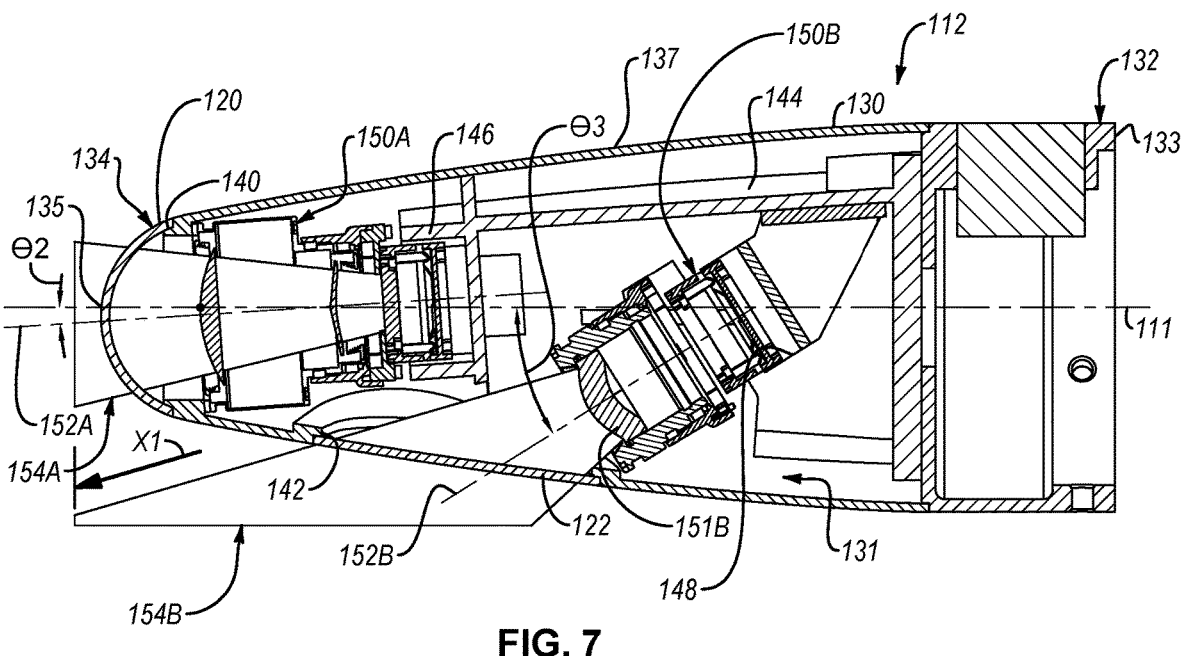
FIG. 7 is a schematic sectional side elevation view of the target tracking apparatus of FIG. 4, taken along the line 6-6 of FIG. 5 and shown with schematic representations of the fields of view of cameras of the target tracking apparatus, according to one or more examples of the present disclosure.

Referring to FIGS. 6, 7, and 9, the target tracking apparatus 112 further includes an interior frame 144 within the interior cavity 131 of the housing 130. The interior frame 144 is fixed relative to the housing 130, such as via any of various mechanical coupling means (e.g., fasteners, clips, interference fits, pins, brackets, etc.), so that the interior frame 144 does not move relative to the housing 130. The interior frame 144 helps to stiffen and strengthen the housing 130. Additionally, the interior frame 144 includes a first-camera receptacle 146 facing the distal-end window 120 and a second-camera receptacle 148 facing the intermediate window 122. The first-camera receptacle 146 and/or the second-camera receptacle 148 can be formed in or attached to the interior frame 144, such that the first-camera receptacle 146 and/or the second-camera receptacle 148 does not move relative to the interior frame 144.

The target tracking apparatus 112 also includes a first camera 150A and a second camera 150B within the interior cavity 131 of the housing 130. The first camera 150A is coupled with the first-camera receptacle 146 of the interior frame 144. Similarly, the second camera 150B is coupled with the second-camera receptacle 148. The first-camera receptacle 146 retains the first camera 150A so that the first camera 150A is fixed relative to the housing 130. Also, the second-camera receptacle 148 retains the second camera 150B so that the second camera 150B is fixed relative to the housing 130. As used herein, the first camera 150A and the second camera 150B being fixed relative to the housing 130 means the first camera 150A and the second camera 150B, as a multi-part unit, do not move relative to the housing 130. Because the first camera 150A and the second camera 150B, as a whole, do not move relative to the housing 130, the orientation of the first camera 150A and the second camera 150B is fixed, or does not change, relative to the direction of flight of the maneuverable flight apparatus 110. Moreover, although the first camera 150A and the second camera 150B can have movable internal parts (e.g., a mechanical shutter) that don't affect the directionality or orientation of the cameras, the first camera 150A and the second camera 150B do not have any moving external parts such that the direction or aim of the cameras do not change relative to the housing 130. Accordingly, the first camera 150A and the second camera 150B can be considered strapped-down or solid-state cameras, which is in direct contrast to gimbaled cameras that are not strapped-down and move relative to the structure to which they are mounted.

Each one of the first camera 150A and the second camera 150B can be any one of various types of cameras, such as visible-light cameras, infrared (IR) cameras, and combinations of the same. In one example, each one of the first camera 150A and the second camera 150B is a long-wave IR (LWIR) camera configured to capture infrared energy in a spectrum (e.g., between 8 μm and 14 μm) associated with heat emitted from the target 106. Accordingly, whether operating in the day or the night, an LWIR capable is capable of capturing images that identify a heat-generating object. Although LWIR cameras are suitable in most examples, in other examples, each one of the first camera 150A and the second camera 150B can be another type of IR camera, such as a short-wave IR (SWIR) camera or a medium-wave IR (MWIR) camera. In the illustrated examples, both the first camera 150A and the second camera 150B are the same type of camera. However, in other examples, the first camera 150A and the second camera 150B can be different types of cameras. Regardless of the type of camera, each one of the first camera 150A and the second camera 150B includes at least one lens and at least one optical sensor that captures light passing through the lens. In some examples, each one of the first camera 150A and the second camera 150B has multiple lenses, including a leading primary lens and one or more secondary lenses, which cooperatively manipulate light (e.g., separate different wavelengths of light) passing through the lenses to be presented to the optical sensor(s) in a manner that promotes accuracy and detail. The primary lens of each camera, particularly the first camera 150A, is configured to reduce spherical aberrations associated with light passing through the curved windows of the target tracking apparatus 112.

Additionally, the primary lens of each camera defines a leading edge of the camera for purposes of defining the location of the camera within the housing 130. In some examples, the first-camera receptacle 146 and the second-camera receptacle 148 of the interior frame 144 are located within the housing 130 so that the leading edge of the second camera 150B is laterally and axially offset relative to the leading edge of the first camera 150A. For example, the leading edge of the second camera 150B is axially offset from the leading edge of the first camera 150A in a direction parallel to the central axis 111 by an offset distance OS. In some examples, the offset distance OS is sufficient that no portion of the second camera 150B laterally (e.g., radially) overlaps with the first camera 150A (i.e., no plane perpendicular to the central axis 111 passes through both the first camera 150A and the second camera 150B). As another example, the leading edge of the second camera 150B is laterally offset (e.g., radially offset) from the leading edge of the first camera 150A in a direction perpendicular to the central axis 111.

The orientation of the first camera 150A and the second camera 150B is defined according to the direction the cameras point or face. The direction a camera faces or points is the direction of a central axis of the camera, which passes through the geometric centers of the lenses of the camera. For example, the first camera 150A faces in a first direction 152A, which is colinear with the central axis of the first camera 150A, and the second camera 150B faces in a second direction 152B, which is colinear with the central axis of the second camera 150B. When retained by the first-camera receptacle 146 and the second-camera receptacle 148, respectively, the first camera 150A faces the distal-end window 120 and the second camera 150B faces the intermediate window 122. In other words, the central axis of the first camera 150A, which is aligned with the first direction 152A, passes through the distal-end window 120 and the central axis of the second camera 150B, which is aligned with the second direction 152B, passes through the intermediate window 122. In this manner, the first camera 150A is located and oriented to capture light passing through the distal-end window 120 and the second camera 150B is located and oriented to capture light passing through the intermediate window 122.

As shown in FIGS. 6 and 7, in some examples, the first camera 150A is angled relative to the central axis 111 such that the first direction 152A defines a second angle θ2, which is a minor angle, relative to the central axis 111. Similarly, in the same examples, the second camera 150B is angled relative to the central axis 111 such that the second direction 152B defines a third angle θ3, which is a minor angle, relative to the central axis 111. Because the cameras are fixed, relative to the housing 130, the second angle θ2 and the third angle θ3 are also fixed, relative to the housing 130. The second angle θ2 is different than the third angle θ3, in some examples. For example, the second angle θ2 can be less than the third angle θ3. The second angle θ2 is greater than 0° and no more than 3° in one example (e.g., about) 0.095°, and the third angle θ3 is between, and inclusive of, 10° and 50° in one example (e.g., about) 32°. According to one example, a ratio of the third angle θ3 to the second angle θ2 is at least 50, such as between, and inclusive of, 50 and 500 (e.g., about 336). Although shown angled relative to the central axis 111 in the illustrated example, according to other examples, the first camera 150A is not angled relative to the central axis 111 so that the first direction 152A is colinear with or parallel to the central axis 111. In other words, in some examples, the second angle θ2 can be zero.

Figures 10, 11:
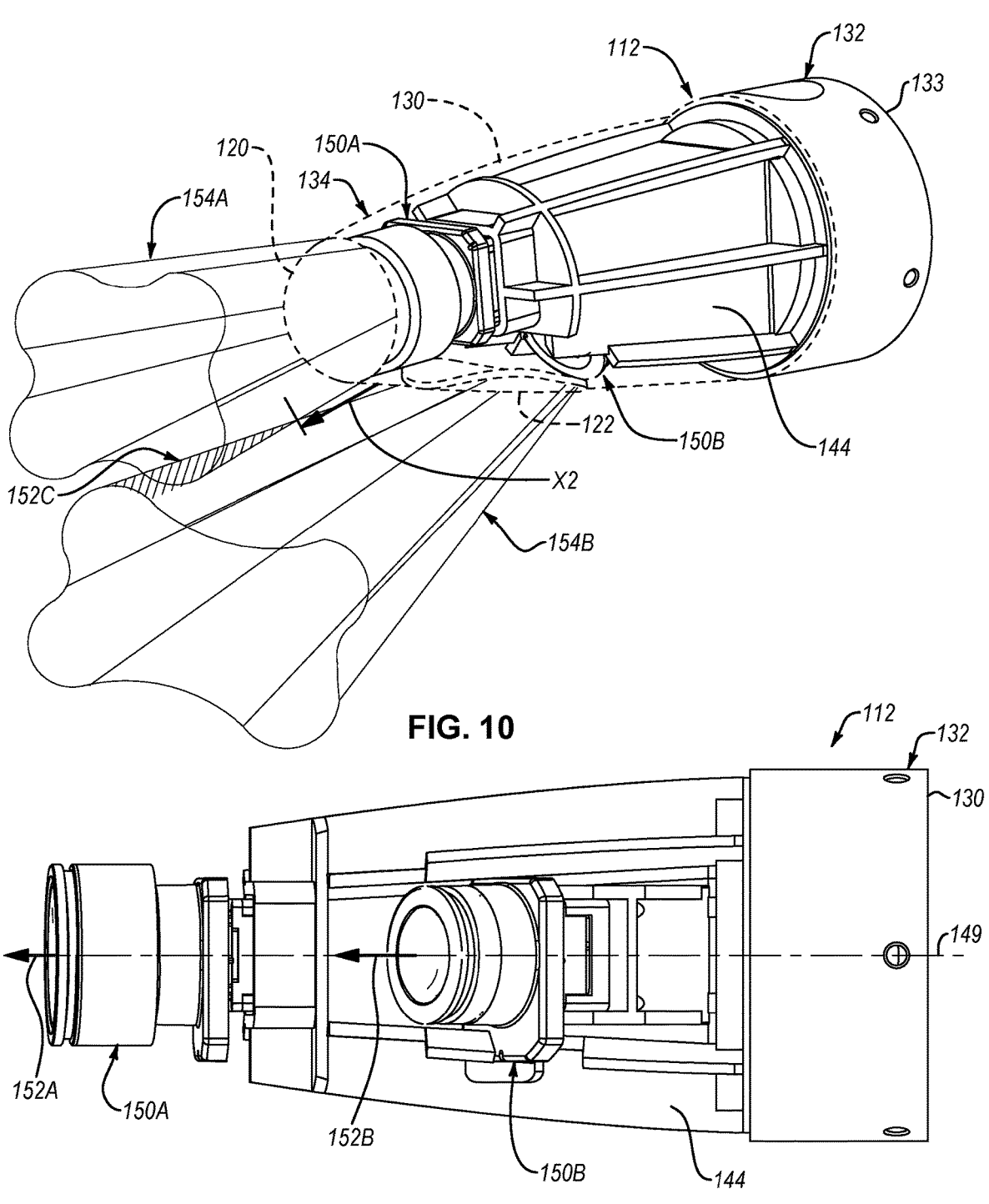
FIG. 10 is a schematic perspective view of the target tracking apparatus of FIG. 4, shown with a housing and windows in hidden view and shown with schematic representations of the fields of view of cameras of the target tracking apparatus, according to one or more examples of the present disclosure.
FIG. 11 is a schematic bottom plan view of the target tracking apparatus of FIG. 4, shown with a housing and windows in hidden view, according to one or more examples of the present disclosure.

Referring to FIG. 11, in some examples, the first direction 152A, the second direction 152B, and the central axis 111 lie within the same plane (e.g., the plane 149). In this configuration, the first camera 150A and the second camera 150B are angled away from the central axis 111 in the same direction. However, in other examples, the first camera 150A and the second camera 150B can be angled away from the central axis 111 in different directions.

Referring back to FIG. 6, each one of the first camera 150A and the second camera 150B has a first field of view 154A and a second field of view 154B, respectively. The field of view of a camera is the maximum area of which the camera can capture an image. Generally, the higher the field of view of a digital camera, the lower the pixel density and resolution of images captured by the camera. Accordingly, there is a tradeoff between the field of view of a camera and the resolution of images captured by the camera. The first field of view 154A of the first camera 150A and the second field of view 154B of the second camera 150B are selected to achieve a desired image resolution for accurately detecting and tracking a target 106. Additionally, the orientations of the first camera 150A and the second camera 150B, relative to each other, are selected such that the first field of view 154A and the second field of view 154B overlap each other to form an overlapping field of view 152C at a location short of the target 106 (see, e.g., FIG. 10). The overlapping field of view 152C ensures the target 106 can be captured in images by the first camera 150A, the second camera 150B, and/or both the first camera 150A and the second camera 150B. In some examples, the overlapping field of view 152C begins at the target tracking apparatus 112. However, in other examples, the overlapping field of view 152C begins at a distance X2 away from the target tracking apparatus 112, such that at some distance X1, which is less than the distance X2, the fields of view do not overlap. The distance X2 can be small enough that detection and tracking of the target 106 within the distance X2 away from the target tracking apparatus 112 is not necessary.

Referring to FIG. 10, in some examples, the size of the first field of view 154A is different than the size of the second field of view 154B. For example, the second field of view 154B can be bigger than the first field of view 154A to promote greater coverage to the sides of the target tracking apparatus 112. In one specific example, the first field of view 154A is an about 18° field of view and the second field of view is an about 32° field of view. However, in other examples, the first field of view 154A and the second field of view 154B have the same size.

Figure 12:
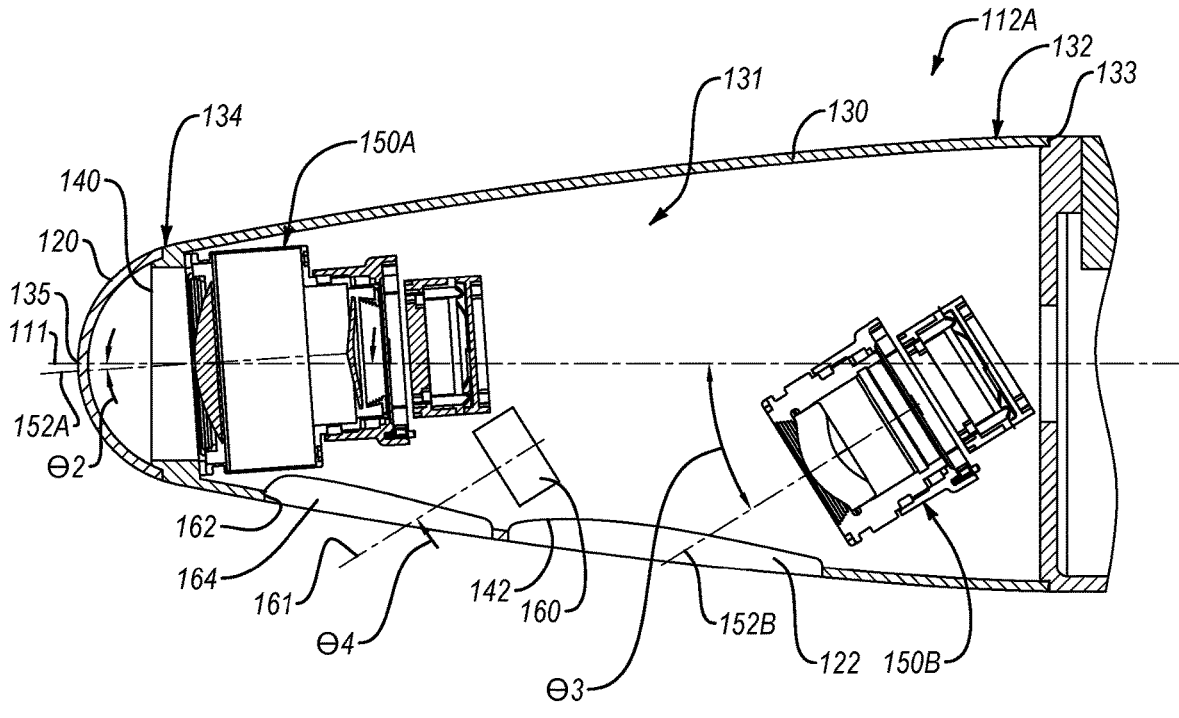
FIG. 12 is a schematic sectional side elevation view of a target tracking apparatus, taken along a line similar to the line 6-6 of FIG. 5, according to one or more examples of the present disclosure.
Figure 13:
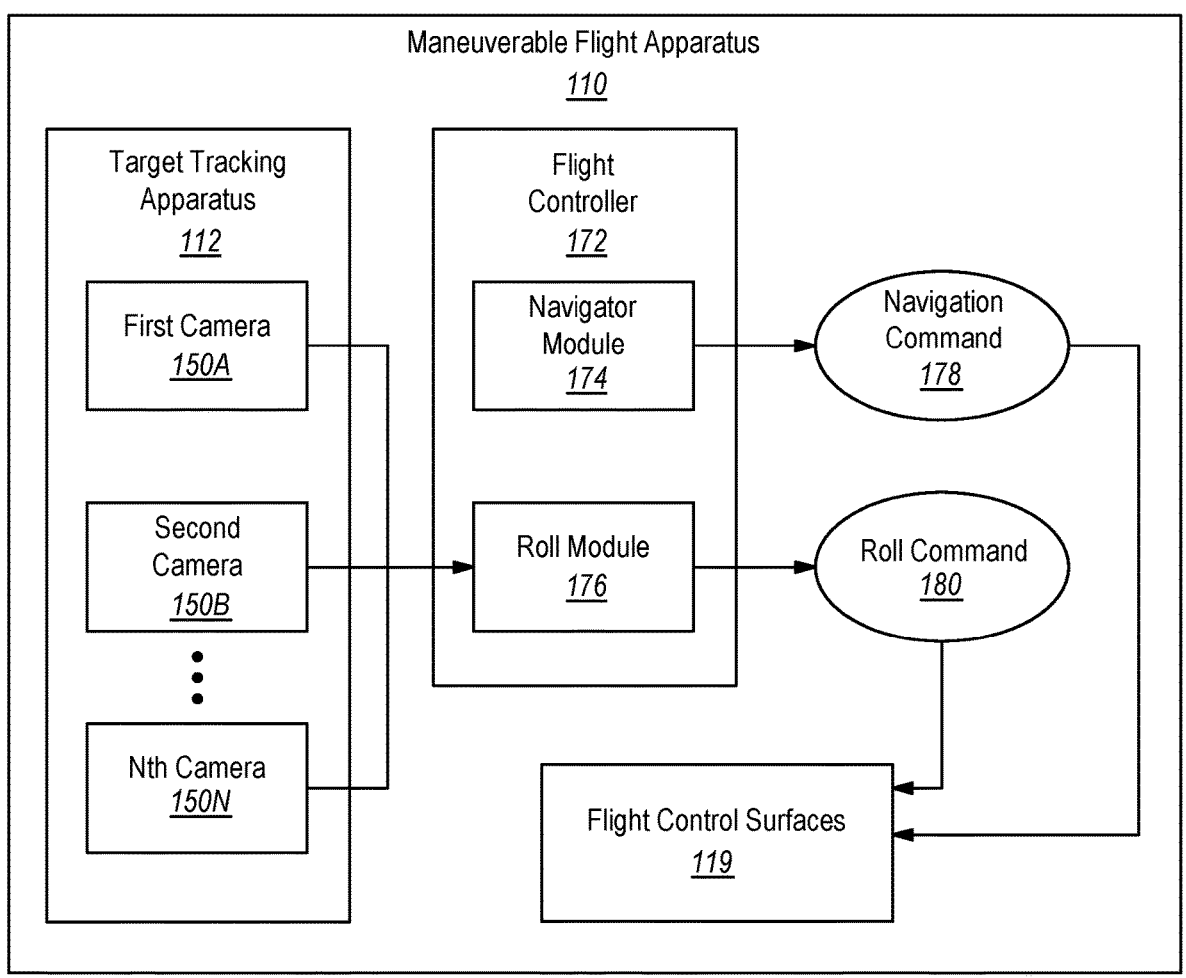
FIG. 13 is a schematic flow diagram of a maneuverable flight apparatus, according to one or more examples of the present disclosure.

In the illustrated examples thus far, the housing 130 includes only two openings, only two windows, and only two corresponding cameras. However, as shown in FIG. 13, the target tracking apparatus 112 of the maneuverable flight apparatus 110 can include any number of fixed cameras up to an Nth camera 150N. For example, as shown in FIG. 12, in some examples, a target tracking apparatus 112A includes a third opening 162, a third window 164 that covers the third opening 162, and a third camera 160 that captures images through the third window 164. The third camera 160 can be the same type of camera as the first camera 150A and the second camera 150B. However, in some examples, the third camera 160 is a different type of camera than the first camera 150A and the second camera 150B. For example, the first camera 150A and the second camera 150B can be IR cameras and the third camera 160 can be a visible-light camera. The additional type of camera can help increase accuracy by providing details in certain environments that are not captured by the other type of cameras. The third camera 160 can face a direction 161 that is the same as the second direction 152B or different than the second direction 152B. In one example, the third camera 160 is axially between the first camera 150A and the second camera 150B, and the direction 161 of the third camera 160 is angled at a fourth angle θ4 relative to the central axis 111, where the fourth angle θ4 is greater than the second angle θ2 and less than the third angle θ3.

FIG. 13 shows an example of the maneuverable flight apparatus 110 that includes at least the target tracking apparatus 112, the flight controller 172, and the flight control surfaces 119. The flight controller 172 includes a navigation module 174 and a roll module 176. The navigation module 174 is configured to process images of the target 106, captured by at least one of the first camera 150A, the second camera 150B, or another camera up to an Nth camera 150N. Moreover, the navigation module 174 processes the images to identify the target 106 and generates navigation commands 178 in response to processing the images. The navigation commands 178 are received by the flight control surfaces 119, which actuate according to the navigation commands 178 to change a flight path or trajectory of the maneuverable flight apparatus 110 after launch. In some examples, such as when the maneuverable flight apparatus 110 is a missile, the navigation commands 178 generated by the navigation module 174 enable the missile to track and ultimately intercept the target 106. Accordingly, the navigation module 174 utilizes the images captured by the first camera 150A and/or the second camera 150B to predict a trajectory of the target 106 and generate the navigation commands 178 in response to the predicted trajectory.

In some examples, for proper identification and tracking of the target 106 by the target tracking apparatus 112, the target 106 must be and remain in the field of view of one or both of the first camera 150A or the second camera 150B. In this manner, one or both of the first camera 150A or the second camera 150B can capture images of the target 106 that are necessary for the navigation module 174 to identify and track the target 106. However, because the orientations of the first camera 150A and the second camera 150B are fixed, and the fields of view of the first camera 150A and the second camera 150B are not large enough to cover 360-degrees around the maneuverable flight apparatus 110, adjustment of the direction of the field of view of the second camera 150B, via rolling of the maneuverable flight apparatus 110, may be necessary to ensure the target 106 is maintained within a field of view of at least one of the first camera 150A and the second camera 150B. By rolling the maneuverable flight apparatus 110 about its central axis 111, the direction of the field of view of the second camera 150B can be adjusted to effectively cover 360-degrees around maneuverable flight apparatus 110 if needed. Accordingly, in addition to generating navigation commands 178 to track and intercept a target 106, the flight controller 172 also includes a roll module 176 that facilitate rolling of the maneuverable flight apparatus 110 when needed.

The roll module 176 is configured to process images of the target 106, captured by at least one of the first camera 150A, the second camera 150B, or another camera up to an Nth camera 150N. Moreover, the roll module 176 processes the images to predict a future location of the target 106 and determines if rolling of the maneuverable flight apparatus 110 is necessary to ensure the target 106 will remain within a field of view of at least one of the first camera 150A and the second camera 150B. If the roll module 176 determines that rolling is necessary, it generates a roll command 180 corresponding with the amount of roll needed to keep the target 106 in a field of view. The roll command 180 is received by the flight control surfaces 119, which actuate according to the roll command 180 to roll the maneuverable flight apparatus 110 about the central axis 111 an amount identified by the roll command 180.

Accordingly, the roll module 176 of the flight controller 172 is configured to actuate the flight control surfaces 119 to roll the maneuverable flight apparatus 110 from a first orientation to a second orientation when the maneuverable flight apparatus 110 is in the first orientation and the target 106 is not in or is predicted not to be in the images captured by the first camera 150A or the second camera 150B. The second orientation is selected by the roll module 176 so that the target 106 is in the images captured by the second camera 150B when the maneuverable flight apparatus 110 is in the second orientation. Put another way, the roll module 176 is configured to actuate the flight control surfaces 119 to roll the maneuverable flight apparatus 110 when the target 106 is not in or is predicted not to be in a field of view of either of the first camera 150A or the second camera 150B so that when rolled the target 106 is in the field of view of at least the second camera 150B. In this manner, the capturing of images of the target 106 can be switched between the first camera 150A and the second camera 150B, or maintained by the second camera 150B, by rolling the maneuverable flight apparatus 110.

It is recognized that the maneuverable flight apparatus 110, in the illustrated embodiment, is not a continuously rolling flight apparatus. Some conventional missiles are designed to continuously roll during flight, which helps provide stability particular when launched. However, the maneuverable flight apparatus 110 does not continuously roll in some examples. Rather, in these examples, the maneuverable flight apparatus 110 is a roll-stabilized flight apparatus that actively stabilizes pitch and yaw axes. Flight apparatuses that do not continuously roll promote improved accuracy, maneuverability, and efficiency.

Referring to FIGS. 14A-14E, several different roll orientations of the target tracking apparatus 112 are shown relative to a horizontal plane 190 (e.g., horizon or ground plane) and a vertical plane 192 perpendicular to the horizontal plane 190. In a first roll orientation shown in FIG. 14A, the target 106 can be within the second field of view 154B of the second camera 150A.

Figures 14A, 14B, 14C, 14D, 14E:
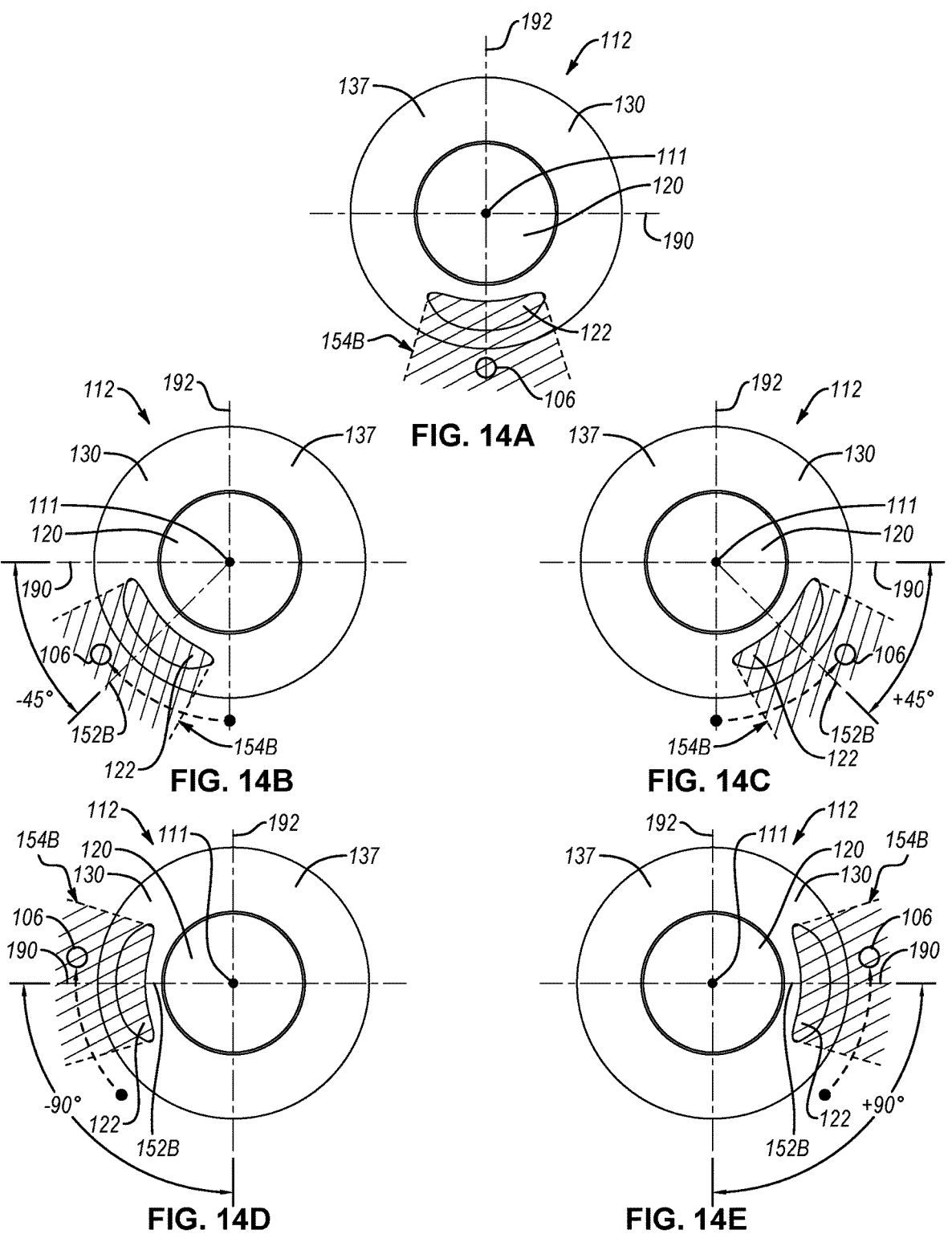
FIGS. 14A-14E are schematic front elevation views of the target tracking apparatus of FIG. 4, each showing the target tracking apparatus in a different roll orientation, according to one or more examples of the present disclosure.

In one example shown in FIG. 14B, the roll module 176 may predict that the target 106 will move (e.g., clockwise as shown) out of the second field of view 154B. Accordingly, the roll module 176 can command the maneuverable flight apparatus 110 to roll an angular amount (e.g., about −45° as shown) to rotate the second field of view 154B so that the target 106 remains in the second field of view 154B. Referring to FIG. 14D, if the target 106 is predicted to continue to move clockwise out of the second field of view 154B, the roll module 176 can command the maneuverable flight apparatus 110 to roll another angular amount (e.g., about −90° total as shown) to rotate the second field of view 154B so that the target 106 remains in the second field of view 154B.

Alternatively, in another example shown in FIG. 14C, the roll module 176 may predict that the target 106 will move (e.g., counterclockwise as shown) out of the field of view 154B. Accordingly, the roll module 176 can command the maneuverable flight apparatus 110 to roll an angular amount (e.g., about +45° as shown) to rotate the second field of view 154B so that the target 106 remains in the second field of view 154B. Referring to FIG. 14E, if the target 106 is predicted to continue to move counterclockwise out of the second field of view 154B, the roll module 176 can command the maneuverable flight apparatus 110 to roll another angular amount (e.g., about +90° total as shown) to rotate the second field of view 154B so that the target 106 remains in the second field of view 154B.

Although the examples of FIGS. 14A-14E are shown corresponding to when the target 106 is predicted to move out of the second field of view 154B, in other examples, the target tracking apparatus 112 can be rolled in a similar manner as described, so that the target is within the second field of view 154B, when the target 106 is predicted to move out of the first field of view 154A.

Figure 15:
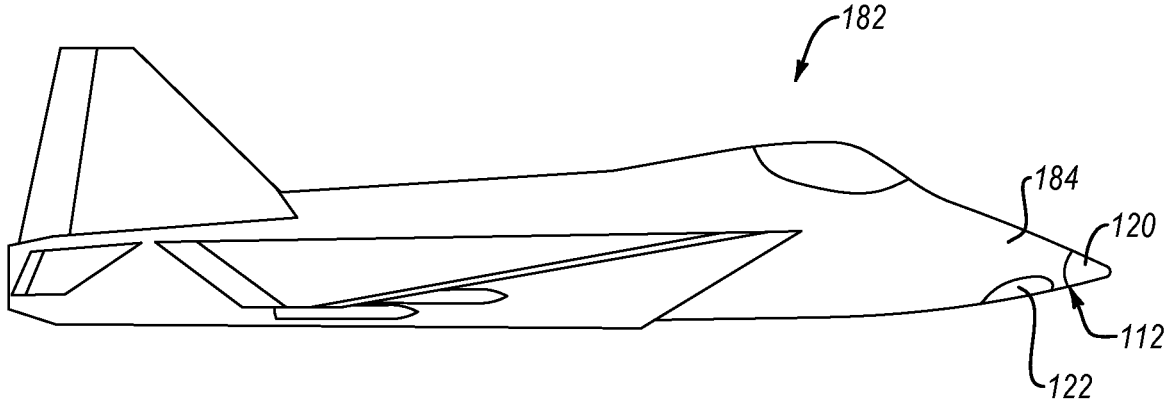
FIG. 15 is a schematic side elevation view of a different type of maneuverable flight apparatus, according to one or more examples of the present disclosure.

Although in the illustrated examples, the maneuverable flight apparatus 110 is represented as a missile, as mentioned, in other example, the maneuverable flight apparatus 110 can be any of various other apparatuses. For example, referring to FIG. 15, the maneuverable flight apparatus 110 can be an aircraft 182 and the target tracking apparatus 112 can define a nose 184 of the aircraft 182. The target tracking apparatus 112 of the aircraft 182 would not necessarily be used to intercept and destroy a target, the target tracking apparatus 112 can be used in the same manner as described above to track the target.

Figure 16:
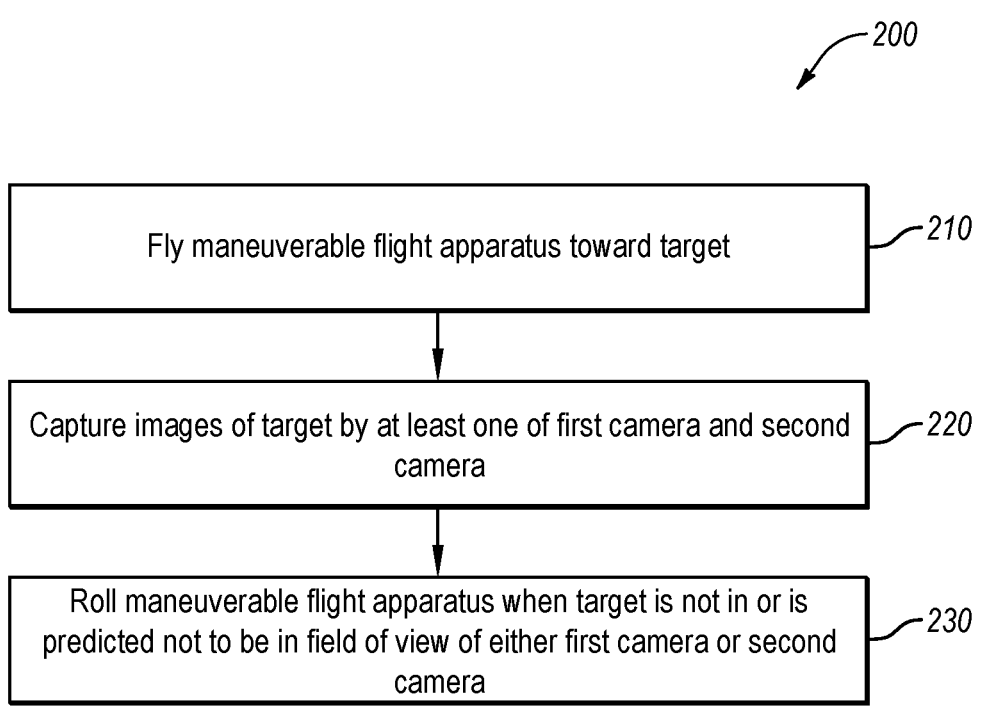
FIG. 16 is a schematic flow chart of a method of tracking a target, according to one or more examples of the present disclosure.

Referring to FIG. 16, according to some examples, the above-described processes and functionality enabled by the maneuverable flight apparatus 110 can be embodied in a method 200 of tracking a target 106. The method 200 includes (block 210) flying the maneuverable flight apparatus toward the target 106. The method 200 also includes (block 220) capturing 220 images of the target 106 by at least one of the first camera 150A or the second camera (150B). The method 200 further includes (block 230) rolling 230 the maneuverable flight apparatus 110, about the central axis 111, when the target 106 is not in or is predicted not to be in a field of view of either of the first camera 150A or the second camera 150B so that when rolled the target 106 is in the field of view of at least the second camera 150B.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagram included herein is generally set forth as a logical flow chart diagram. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Many of the functional units described in this specification have been labeled as modules or a controller, in order to more particularly emphasize their implementation independence. For example, a module or controller may be implemented as a hardware circuit comprising custom VLSI circuits or gate arrays, off-the-shelf semiconductors such as logic chips, transistors, or other discrete components. A module or controller may also be implemented in programmable hardware devices such as field programmable gate arrays, programmable array logic, programmable logic devices or the like.

Modules and controllers may also be implemented in code and/or software for execution by various types of processors. An identified module of code or controller may, for instance, comprise one or more physical or logical blocks of executable code which may, for instance, be organized as an object, procedure, or function. Nevertheless, the executables of an identified module or controller need not be physically located together, but may comprise disparate instructions stored in different locations which, when joined logically together, comprise the module or controller and achieve the stated purpose for the module or controller.

Indeed, a module of code or controller may be a single instruction, or many instructions, and may even be distributed over several different code segments, among different programs, and across several memory devices. Similarly, operational data may be identified and illustrated herein within modules or controllers, and may be embodied in any suitable form and organized within any suitable type of data structure. The operational data may be collected as a single data set, or may be distributed over different locations including over different computer readable storage devices. Where a module (or controller) or portions of a module (or controller) are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for examples may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The described features, structures, or characteristics of the examples may be combined in any suitable manner. In the above description, numerous specific details are provided, such as examples of programming, software modules, user selections, network transactions, database queries, database structures, hardware modules, hardware circuits, hardware chips, etc., to provide a thorough understanding of examples. One skilled in the relevant art will recognize, however, that examples may be practiced without one or more of the specific details, or with other methods, components, materials, and so forth. In other instances, well-known structures, materials, or operations are not shown or described in detail to avoid obscuring aspects of an example.

Aspects of the examples are described above with reference to schematic flowchart diagrams and/or schematic block diagrams of methods, apparatuses, systems, and program products according to examples. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/ acts specified in the flowchart and/or block diagram block or blocks.

The schematic flowchart diagrams and/or schematic block diagrams in the figures can illustrate the architecture, functionality, and operation of possible implementations of apparatuses, systems, methods and program products according to various examples. In this regard, each block in the schematic flowchart diagrams and/or schematic block diagrams may represent a module, controller segment, or portion of code, which comprises one or more executable instructions of the code for implementing the specified logical function(s).

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A target tracking apparatus, comprising:

a housing defining an exterior surface of the target tracking apparatus, and comprising an interior cavity, a distal opening formed in the exterior surface, at a distal end portion of the target tracking apparatus, and open to the interior cavity, and an intermediate opening formed in the exterior surface, at a location between the distal end portion and a proximal end portion of the target tracking apparatus;

a distal-end window attached to the housing over the distal opening and defining a distal end of the target tracking apparatus;

an intermediate window attached to the housing over the intermediate opening;

a first camera within the interior cavity, configured to capture images through the distal-end window, and fixed, relative to the housing, such that the first camera does not move relative to the housing; and a second camera within the interior cavity, configured to capture images through the intermediate window, and fixed, relative to the housing, such that the second camera does not move relative to the housing.

2. The target tracking apparatus according to claim 1, wherein the exterior surface converges along a length of the target tracking apparatus from the proximal end portion of the target tracking apparatus to the distal end portion of the target tracking apparatus.

3. The target tracking apparatus according to claim 2, wherein a maximum width of the distal-end window, along a first plane perpendicular to the length of the target tracking apparatus, is less than a maximum width of the housing, along a second plane perpendicular to the length of the target tracking apparatus.

4. The target tracking apparatus according to claim 1, wherein:

a central axis of the target tracking apparatus passes through a geometric center of the housing and a geometric center of the distal-end window;

the first camera is pointed in a first direction that is angled relative to the central axis; and the second camera is pointed in a second direction that is angled relative to the central axis and angled relative to the first direction.

5. The target tracking apparatus according to claim 4, wherein:

the central axis, the first direction, and the second direction lie within the same plane; and a first camera angle defined between the central axis and the first direction is less than a second camera angle defined between the central axis and the second direction.

6. The target tracking apparatus according to claim 5, wherein:

the first camera has a first field of view;

the second camera has a second field of view; and the first field of view and the second field of view overlap beyond a distance away from the target tracking apparatus.

7. The target tracking apparatus according to claim 5, wherein the first field of view is less than the second field of view.

8. The target tracking apparatus according to claim 5, wherein the first camera and the second camera are angled away from the central axis in the same direction.

9. The target tracking apparatus according to claim 1, wherein the second camera is offset, along a length of the target tracking apparatus, relative to the first camera.

10. The target tracking apparatus according to claim 1, wherein:

a central axis of the target tracking apparatus passes through a geometric center of the housing and a geometric center of the distal-end window;

the distal-end window is curved along a plane that passes through the distal-end window and within which the central axis lies;

the intermediate window is curved along a plane that passes through the intermediate window and within which the central axis lies; and the curvature of the distal-end window, along the plane that passes through the distal-end window and within which the central axis lies, is more than the curvature of the intermediate window, along the plane that passes through the intermediate window and within which the central axis lies.

11. The target tracking apparatus according to claim 1, wherein:

a central axis of the target tracking apparatus passes through a geometric center of the housing and a geometric center of the distal-end window;

the distal-end window is circular shaped along a plane perpendicular to the central axis; and the intermediate window is elongated in a direction parallel to the central axis of the target tracking apparatus.

12. The target tracking apparatus according to claim 1, wherein the target tracking apparatus is void of a camera cooling system.

13. The target tracking apparatus according to claim 1, wherein the target tracking apparatus defines a front end of a missile.

14. A maneuverable flight apparatus for tracking a target, the maneuverable flight apparatus comprising:

a target tracking apparatus, comprising:

a housing;

a distal-end window attached to the housing over a distal opening in the housing;

an intermediate window attached to the housing over an intermediate opening in the housing that is offset from the distal opening along a length of the housing;

a first camera within the housing, configured to capture images through the distal-end window, and fixed, relative to the housing, such that the first camera does not move relative to the housing; and a second camera within the housing, configured to capture images through the intermediate window, and fixed, relative to the housing, such that the second camera does not move relative to the housing;

flight control surfaces actuatable to control pitch, roll, and yaw of the maneuverable flight apparatus when the maneuverable flight apparatus is in flight;

a propulsion system configured to generate thrust; and a flight controller configured to actuate the flight control surfaces based on images of the target captured by at least one of the first camera or the second camera.

15. The maneuverable flight apparatus according to claim 14, wherein the flight controller is configured to actuate the flight control surfaces to roll the maneuverable flight apparatus from a first orientation to a second orientation when the maneuverable flight apparatus is in the first orientation and the target is not in or is predicted not to be in the images captured by the first camera and the second camera, wherein the second orientation is selected by the flight controller so that the target is in the images captured by the second camera when the maneuverable flight apparatus is in the second orientation.

16. The maneuverable flight apparatus according to claim 14, wherein the flight controller is configured to actuate the flight control surfaces to roll the maneuverable flight apparatus when the target is not in or is predicted not to be in a field of view of either of the first camera or the second camera so that when rolled the target is in the field of view of at least the second camera.

17. The maneuverable flight apparatus according to claim 14, wherein:

a central axis of the target tracking apparatus passes through a geometric center of the housing and a geometric center of the distal-end window;

the first camera is pointed in a first direction that is angled relative to the central axis; and the second camera is pointed in a second direction that is angled relative to the central axis and angled relative to the first direction.

18. The maneuverable flight apparatus according to claim 14, wherein:

the maneuverable flight apparatus is a missile;

the target tracking apparatus defines a front end of the missile; and the housing is tapered.

19. A method of tracking a target, the method comprising:

flying a maneuverable flight apparatus toward the target;

capturing images of the target by at least one of a first camera of the maneuverable flight apparatus, which faces a first direction that is fixed relative to the direction of flight of the maneuverable flight apparatus, or a second camera of the maneuverable flight apparatus, which is offset from the first camera along a length of the maneuverable flight apparatus and faces a second direction that is fixed relative to the direction of flight of the maneuverable flight apparatus, wherein the second direction is different than the first direction; and rolling the maneuverable flight apparatus when the target is not in or is predicted not to be in a field of view of either of the first camera or the second camera so that when rolled the target is in the field of view of at least the second camera.

20. The method according to claim 19, wherein the maneuverable flight apparatus is a missile and flying the maneuverable flight apparatus comprises launching the missile from a ground location using a hand-held gripstock.

* * * * *